United States Patent
Miyakoshi et al.

(10) Patent No.: US 10,198,618 B2
(45) Date of Patent: Feb. 5, 2019

(54) COMMODITY REGISTRATION APPARATUS CONFIGURED TO PERFORM OBJECT RECOGNITION

(71) Applicant: TOSHIBA TEC KABUSHIKI KAISHA, Tokyo (JP)

(72) Inventors: Hidehiko Miyakoshi, Mishima Shizuoka (JP); Hitoshi Iizaka, Fuji Shizuoka (JP); Hidehiro Naitou, Mishima Shizuoka (JP); Yuichiro Hatanaka, Mishima Shizuoka (JP); Yuta Sasaki, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/689,720

(22) Filed: Aug. 29, 2017

(65) Prior Publication Data
US 2018/0068168 A1    Mar. 8, 2018

(30) Foreign Application Priority Data
Sep. 7, 2016    (JP) ................. 2016-174856

(51) Int. Cl.
*G06K 9/00* (2006.01)
*G06K 9/58* (2006.01)
(Continued)

(52) U.S. Cl.
CPC ........... *G06K 9/00201* (2013.01); *G06K 9/58* (2013.01); *G06K 9/6215* (2013.01); *G06K 9/6254* (2013.01); *G06K 9/6263* (2013.01); *G07G 1/0009* (2013.01); *G07G 1/0036* (2013.01); *G06K 2209/17* (2013.01)

(58) Field of Classification Search
None
See application file for complete search history.

(56) References Cited

U.S. PATENT DOCUMENTS 9,036,870 B2 *   5/2015   Sugasawa .......... G06K 9/00671
                                                        348/169
9,508,151 B2 *  11/2016   Romanik .................. G06T 7/73
(Continued)

*Primary Examiner* — Soo Jin Park
(74) *Attorney, Agent, or Firm* — Patterson & Sheridan, LLP

(57) ABSTRACT

A commodity registration apparatus configured to perform object recognition includes an interface connected to receive captured images, a storage unit storing a dictionary for the object recognition, and a processor. The processor is configured to designate a learning target article for learning processing, extract, from each captured image, feature value indicating feature of an article contained in the captured image, compare each of the extracted feature values with stored feature values of the learning target article registered in the dictionary and calculate a similarity degree therebetween, generate relationship information indicating a relationship between the captured images based on the calculated similarity degrees, exclude captured images that meet a predetermined condition based on the relationship information, and execute the learning processing by adding, to the dictionary with respect to the learning target article, the feature values indicating features of the article contained in the non-excluded captured images.

20 Claims, 13 Drawing Sheets

(51) Int. Cl.
*G07G 1/00* (2006.01)
*G06K 9/62* (2006.01)

(56) References Cited

U.S. PATENT DOCUMENTS

| | | |
|---|---|---|
| 2014/0040186 A1 | 2/2014 | Okamura et al. |
| 2014/0064569 A1* | 3/2014 | Sugasawa .......... G06K 9/00671 |
| | | 382/110 |
| 2015/0026017 A1* | 1/2015 | Tsunoda ............. G06Q 30/0643 |
| | | 705/27.2 |

\* cited by examiner

| COMMODITY ID | COMMODITY CATEGORY | COMMODITY NAME | VARIETY | UNIT PRICE | ILLUSTRATION IMAGE | FEATURE AMOUNT |
|---|---|---|---|---|---|---|
| XXXXXXXX | AA | AAA | | 100 YEN | | XXXXXXXX |
| ...... | ...... | ...... | ...... | ...... | ...... | ...... |
| XXXXXXXX | BB | BBB1 | VARIETY 1 | 100 YEN | | XXXXXXXX |
| XXXXXXXX | BB | BBB2 | VARIETY 2 | 150 YEN | | XXXXXXXX |
| XXXXXXXX | BB | BBB3 | VARIETY 3 | 200 YEN | | XXXXXXXX |
| XXXXXXXX | BB | BBB4 | VARIETY 4 | 250 YEN | | XXXXXXXX |

COMMODITY REGISTRATION APPARATUS CONFIGURED TO PERFORM OBJECT RECOGNITION

CROSS-REFERENCE TO RELATED APPLICATION

This application is based upon and claims the benefit of priority from Japanese Patent Application No. 2016-174856, filed Sep. 7, 2016, the entire contents of which are incorporated herein by reference.

FIELD

Embodiments described herein relate generally to a commodity registration apparatus configured to perform object recognition.

BACKGROUND

In a generic object recognition technology, feature value of an article is extracted from an image captured by an image capturing element, and is compared with feature value of each reference article registered in a dictionary beforehand. A category of the article is recognized based on a similarity degree therebetween. Moreover, a technology in which commodities such as vegetables and fruits and the varieties thereof are identified with the generic object recognition technology described above to execute sales registration of the commodity based on identification results has been proposed.

In a dictionary used in the above generic object recognition, feature value for collation (comparison) is registered in advance. However, articles such as vegetables and fruits which are recognition targets of the generic object recognition are different in texture and color of a surface thereof depending on producing areas, even for the same variety in some cases. If the texture and the color of the surface are different even for the same variety, the similarity degree by comparison with the feature value registered in the dictionary becomes small. Thus, there is a problem that a recognition rate is lowered. Therefore, according to the conventional technology, a learning function is provided to newly register or update the feature value from images that are newly captured.

However, if a foreign object such as a hand of an operator is contained in a captured image for learning, there is a possibility that the recognition rate is lowered compared with the recognition rate before the learning operation is carried out. Thus, it is desirable to exclude the captured image containing the foreign object from a target of the learning operation. However, in the conventional technology, the operator needs to confirm states of the captured images one by one to determine whether or not the captured image is set as the target of the learning operation and thus it is very troublesome and an inefficient operation for the operator.

BRIEF DESCRIPTION OF THE DRAWINGS

FIG. 3 is a diagram illustrating an example structure of a PLU file;

DETAILED DESCRIPTION

In accordance with an embodiment, a commodity registration apparatus configured to perform object recognition includes an interface connected to receive captured images, a storage unit storing a dictionary for the object recognition, and a processor. The processor is configured to designate a learning target article which is target of a learning processing, extract, from each captured image, feature value indicating feature of an article contained in the captured image, compare each of the extracted feature values with stored feature values of the learning target article registered in the dictionary, and calculate a similarity degree therebetween, generate relationship information indicating a relationship between the captured images based on the calculated similarity degrees, exclude one or more of the captured images that meet a predetermined condition based on the relationship information, and execute the learning processing by adding, to the dictionary with respect to the learning target article, the feature values indicating features of the article contained in the captured images remaining after the exclusion processing is carried out.

Hereinafter, a commodity registration apparatus configured to perform an object recognition and a related method according to the present embodiment are described with reference to the accompanying drawings. In the present embodiment, an invention is applied to a checkout system, introduced into a store such as a supermarket, which is equipped with a POS terminal for registering commodities (commodity registration function) and carrying out the settlement (settlement function) in one transaction. However, the invention is not limited to the embodiment. For example, the commodity registration function and the settlement function may be physically separated from one the other as apparatuses.

Figure 1:
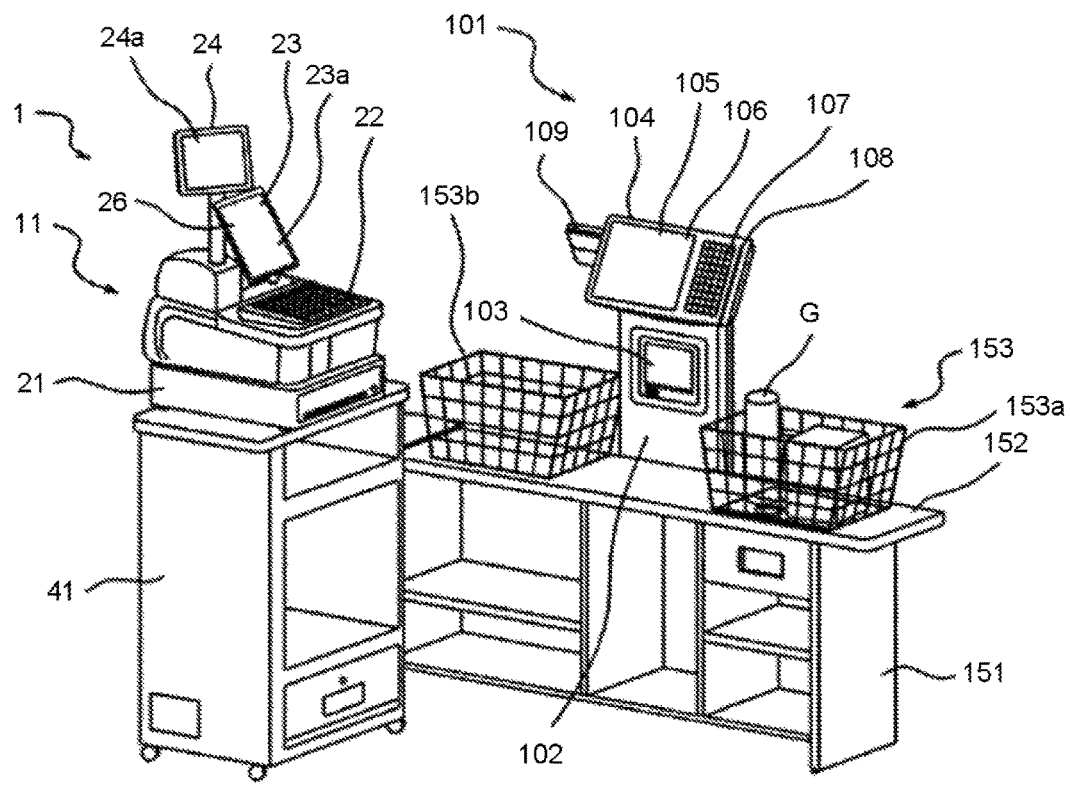
FIG. 1 is a perspective view illustrating an example of a checkout system according to an embodiment.

FIG. 1 is a perspective view illustrating a checkout system 1. As shown in FIG. 1, the checkout system 1 includes a commodity reading apparatus 101 for reading information relating to a commodity and a POS terminal 11 for registering the commodity and carrying out the settlement in one transaction. Hereinafter, the POS terminal 11 is applied as the commodity registration apparatus performing the object recognition according to the present embodiment.

The POS terminal 11 is placed on a drawer 21 on a register table 41. The drawer 21 is opened or closed under the control of the POS terminal 11. The POS terminal 11 is equipped with a keyboard 22 operated by an operator (e.g., store clerk) on the upper surface thereof. A display device for store clerk 23 for displaying information to the store clerk is arranged at the rear side of the keyboard 22, as viewed from the store clerk who operates the keyboard 22. The display device 23 displays information on a display surface 23a thereof. A touch panel 26 is laminated the display surface 23a. A display device for customer 24 is arranged to be rotatable at a rear side of the display device 23. The display device 24 displays information on a display surface 24a thereof. The display device 24 shown in FIG. 1 sets the display surface 24a to face the store clerk. Also, by rotating the display device 24, the display surface 24a of the display device 24 faces toward the customer to display information to the customer.

A checkout counter 151 having horizontally elongated shape is arranged so as to form an L-shape with the register table 41 on which the POS terminal 11 is placed. A receiving surface 152 is formed on the checkout counter 151. Shopping basket 153 which receives a commodity G therein is placed on the receiving surface 152. It can be understood that the shopping basket 153 includes a first shopping basket 153a, placed on the receiving surface 152, which is brought by a customer and a second shopping basket 153b placed on the receiving surface 152 opposite to the first shopping basket 153a across the commodity reading apparatus 101. The shopping basket 153, which is not limited to a so-called basket shape, may be a tray and the like . Further, the shopping basket 153 (second shopping basket 153b), which is not limited to a so-called basket shape, may be a box, a bag and the like.

The commodity reading apparatus 101, which is connected with the POS terminal 11 for communicating data, is arranged on the receiving surface 152 of the checkout counter 151. The commodity reading apparatus 101 includes a thin rectangular housing 102. A reading window 103 is arranged on the front surface of the housing 102. A display and operation section 104 is installed on the upper portion of the housing 102. The display and operation section 104 includes a display device 106 acting as a display section on which a touch panel 105 is laminated. A keyboard 107 is arranged at the right side of the display device 106. A card reading slot 108 of a card reader (not shown) is arranged at the right side of the keyboard 107. A customer display device 109 for providing information to a customer is arranged at the left rear side on the back surface of the display and operation section 104 as viewed from the store clerk.

Figure 2:
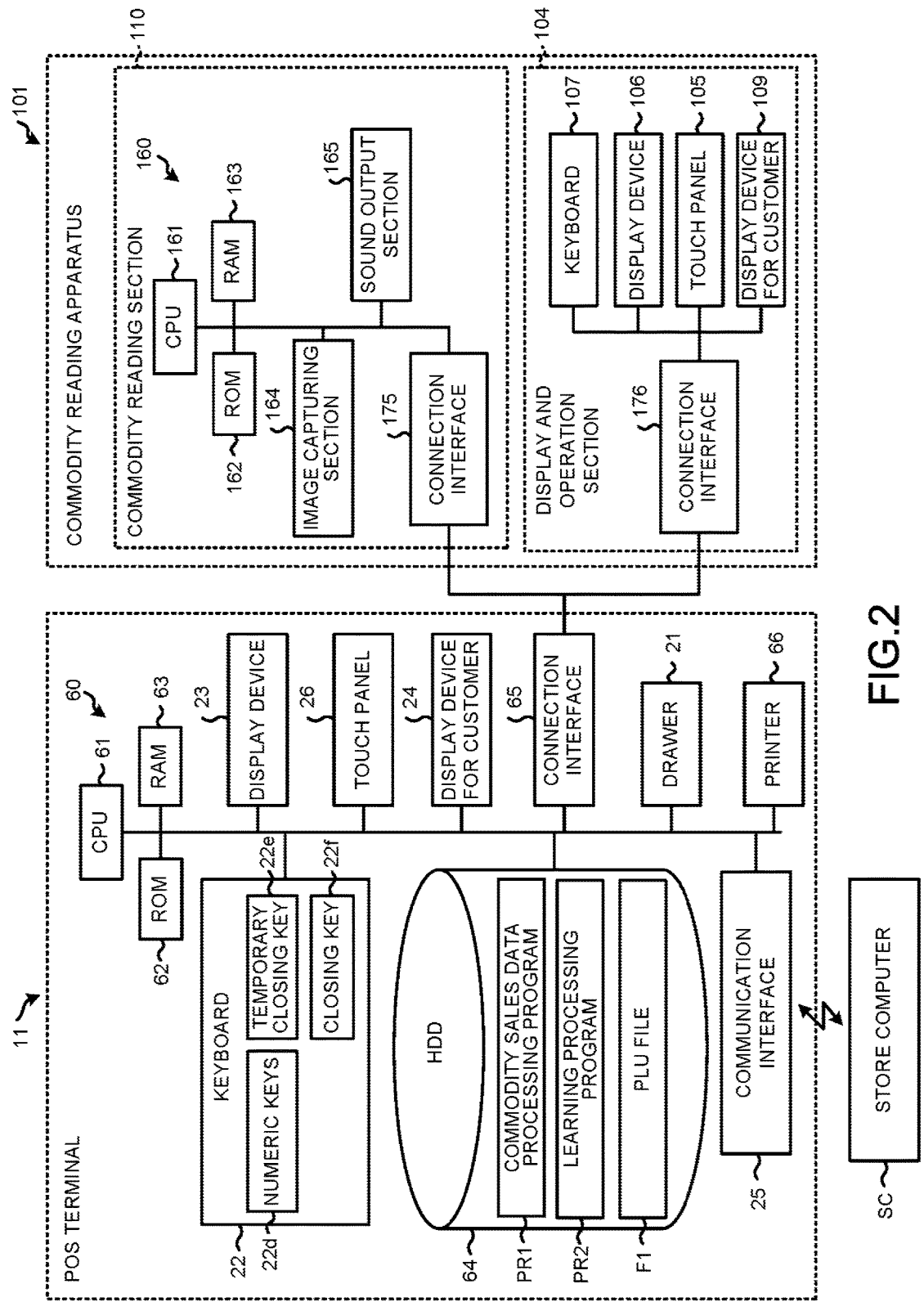
FIG. 2 is a block diagram illustrating example configurations of a POS terminal and a commodity reading apparatus.

The commodity reading apparatus 101 includes a commodity reading section 110 (refer to FIG. 2) . The commodity reading section 110 includes an image capturing section 164 (refer to FIG. 2) arranged at the rear side of the reading window 103.

The commodities G purchased in one transaction are housed in the first shopping basket 153a brought by the customer. The commodities G in the first shopping basket 153a are moved one by one to the second shopping basket 153b by the store clerk who operates the commodity reading apparatus 101. During the movement, the commodity G is directed to the reading window 103 of the commodity reading apparatus 101. At this time, the image capturing section 164 (refer to FIG. 2) arranged inside the reading window 103 captures an image of the commodity G.

In the commodity reading apparatus 101, a screen for designating a commodity, registered in a later-described PLU file F1 (refer to FIG. 3), which corresponds to the commodity G contained in the image captured by the image capturing section 164 is displayed on the display and operation section 104. A commodity ID of the commodity designated by the store clerk is sent to the POS terminal 11 by the commodity reading apparatus 101. In the POS terminal 11, information relating to the sales registration of a commodity name, unit price and the like of the commodity specified with the commodity ID is recorded in a sales master file (not shown) based on the commodity ID sent from the commodity reading apparatus 101 to carry out sales registration.

FIG. 2 is a block diagram illustrating configurations of the POS terminal 11 and the commodity reading apparatus 101. The POS terminal 11 includes a microcomputer 60 as an information processing section for executing an information processing. The microcomputer 60 includes a ROM (Read Only Memory) 62 and a RAM (Random Access Memory) 63 each connected via a bus line to a CPU (Central Processing Unit) 61 which executes various kinds of arithmetic processing to control each section of the POS terminal 11.

The drawer 21, the keyboard 22, the display device 23, the touch panel 26 and the display device for customer 24 mentioned above are all connected with the CPU 61 of the POS terminal 11 via various input/output circuits and are controlled by the CPU 61.

The keyboard 22 includes numeric keys 22d on which numeric characters such as "1", "2", "3" and the like and arithmetic operators such as multiplication are displayed, a temporary closing key 22e and a closing key 22f.

An HDD (Hard Disk Drive) 64 is connected with the CPU 61 of the POS terminal 11. The HDD 64 stores programs and various files. At the time the POS terminal 11 is started, the programs and the various files stored in the HDD 64 are all or partially developed or expanded on the RAM 63 to be executed by the CPU 61. The programs stored in the HDD 64 include, for example, a commodity sales data processing program PR1 and a learning processing program PR2. The files stored in the HDD 64 include, for example, a PLU file F1 delivered from a store computer SC to be stored.

The PLU file F1 is a commodity file in which information relating to the sales registration of the commodity G is stored for each of the commodities G displayed and sold in the store. In the following description, the PLU file F1 is referred to as a dictionary; however, the dictionary may be a file different from the PLU file F1. The dictionary stores feature value data (reference data) of the commodity extracted from the captured image data. In a case in which the dictionary is a file different from the PLU file F1, the feature value relating to the same commodity is associated with information stored in the PLU file F1 by a commodity ID described later. The feature value is obtained by parameterizing an appearance feature such as the standard shape, surface tint, pattern, unevenness state and the like of the commodity.

FIG. 3 illustrates the data structure of the PLU file F1. As shown in FIG. 3, the PLU file F1 stores information relating to a commodity such as a commodity ID serving as identification information uniquely assigned to each commodity G, a commodity category the commodity G belongs to, a commodity name, variety, a unit price and the like, an illustration image indicating the commodity G, and the feature values indicating tint and unevenness condition of the surface read from a captured commodity image as commodity information of the commodity G. The feature value is used in the later-described similarity degree determination. The PLU file F1 can be read by the commodity reading apparatus 101 through a later-described connection interface 65.

Furthermore, in a case in which it is necessary to recognize detect the variety of the commodity, the PLU file F1 manages information relating to the commodity such as a commodity name, a unit price and the like, an illustration image indicating the commodity and the feature values for each variety in an associated manner (refer to BBB1~BBB4) as shown in FIG. 3. In a case of displaying a candidate by using characters instead of the illustration image, the illustration image may not be stored in the PLU file F1.

Returning to FIG. 2, a communication interface 25 for executing a data communication with the store computer SC is connected to the CPU 61 of the POS terminal 11 through an input/output circuit (not shown). The store computer SC is provided, for example, at a back office in a store. The HDD (not shown) of the store computer SC stores the PLU file F1 to be delivered to the POS terminal 11.

A connection interface 65 which enables data communication with the commodity reading apparatus 101 is connected to the CPU 61 of the POS terminal 11. The commodity reading apparatus 101 is connected to the connection interface 65. A printer 66 which carries out printing on a receipt is connected to the CPU 61 of the POS terminal 11. The printer 66 prints content of one transaction on the receipt under the control of the CPU 61.

The commodity reading apparatus 101 also includes a microcomputer 160. The microcomputer 160 includes a ROM 162 and a RAM 163 connected with a CPU 161 through a bus line. The ROM 162 stores programs to be executed by the CPU 161. The image capturing section 164 and a sound output section 165 are connected with the CPU 161 through various kinds of input/output circuits (none is shown). The operations of the image capturing section 164 and the sound output section 165 are controlled by the CPU 161. The display and operation section 104 is connected with the commodity reading section 110 and the POS terminal 11 through a connection interface 176. In the display and operation section 104, the connection interface 176 is connected to the touch panel 105, the display device 106, the keyboard 107 and the display device for customer 109. The operation of the display and operation section 104 is controlled by the CPU 161 of the commodity reading section 110 and the CPU 61 of the POS terminal 11.

The image capturing section 164, e.g., a color CCD image sensor or a color CMOS image sensor and the like, is an image capturing module for carrying out an image capturing operation through the reading window 103 under the control of the CPU 161. For example, the image capturing section 164 captures moving images at 30 fps (frames per second). The frame images sequentially captured by the image capturing section 164 at a predetermined frame rate are stored in the RAM 163.

The sound output section 165 includes a sound circuit and a speaker for issuing a preset warning sound and the like. The sound output section 165 gives a notification with a voice or a warning sound under the control of the CPU 161.

Further, a connection interface 175 connected with the connection interface 65 of the POS terminal 11 to enable the data transmission/reception to/from the POS terminal 11 is connected with the CPU 161. The CPU 161 performs data communication with the display and operation section 104 through the connection interface 175.

Next, the functional components of the CPU 61 and the CPU 161 realized by executing programs by the CPU 61 and the CPU 161 are described with reference to FIG. 4.

Figure 4:
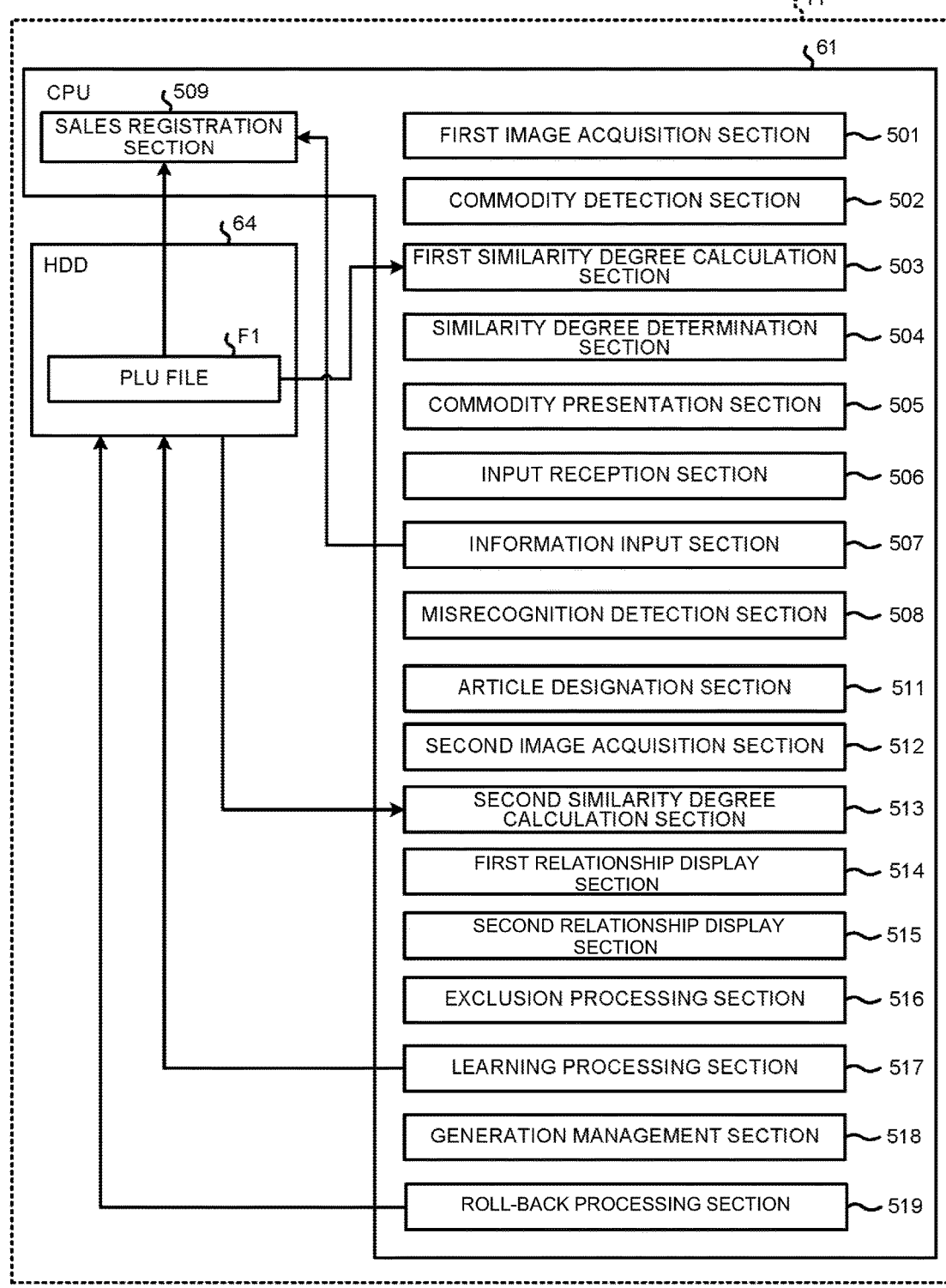
FIG. 4 is a block diagram illustrating functional components of the POS terminal.

FIG. 4 is a block diagram illustrating the functional components of the POS terminal 11. First, functional components relating to a commodity registration processing and a sales registration processing are described. In one embodiment, the CPU 61 of the POS terminal 11 is programmed with the commodity sales data processing program PR1 to realize the functions of a first image acquisition section 501, a commodity detection section 502, a first similarity degree calculation section 503, a similarity degree determination section 504, a commodity presentation section 505, an input reception section 506, an information input section 507, a misrecognition detection section 508 and a sales registration section 509 as functional sections. In another embodiment, the CPU 61 is a hardware controller, e.g., an application specific integrated circuit (ASIC) and field programmable gate array (FPGA), that is configured to carry out the functions of the first image acquisition section 501, the commodity detection section 502, the first similarity degree calculation section 503, the similarity degree determination section 504, the commodity presentation section 505, the input reception section 506, the information input section 507, the misrecognition detection section 508 and the sales registration section 509.

The first image acquisition section 501 represents the CPU 61 programmed to execute the following steps of the commodity sales data processing program PR1. The first image acquisition section 501 outputs an ON-signal to the image capturing section 164 to start an image capturing operation by the image capturing section 164. The first image acquisition section 501 sequentially acquires the captured images captured by the image capturing section 164 after the image capturing operation is started, and the captured images are stored in the RAM 163. The first image acquisition section 501 acquires the captured images in an order in which they are stored in the RAM 163.

Figure 5:
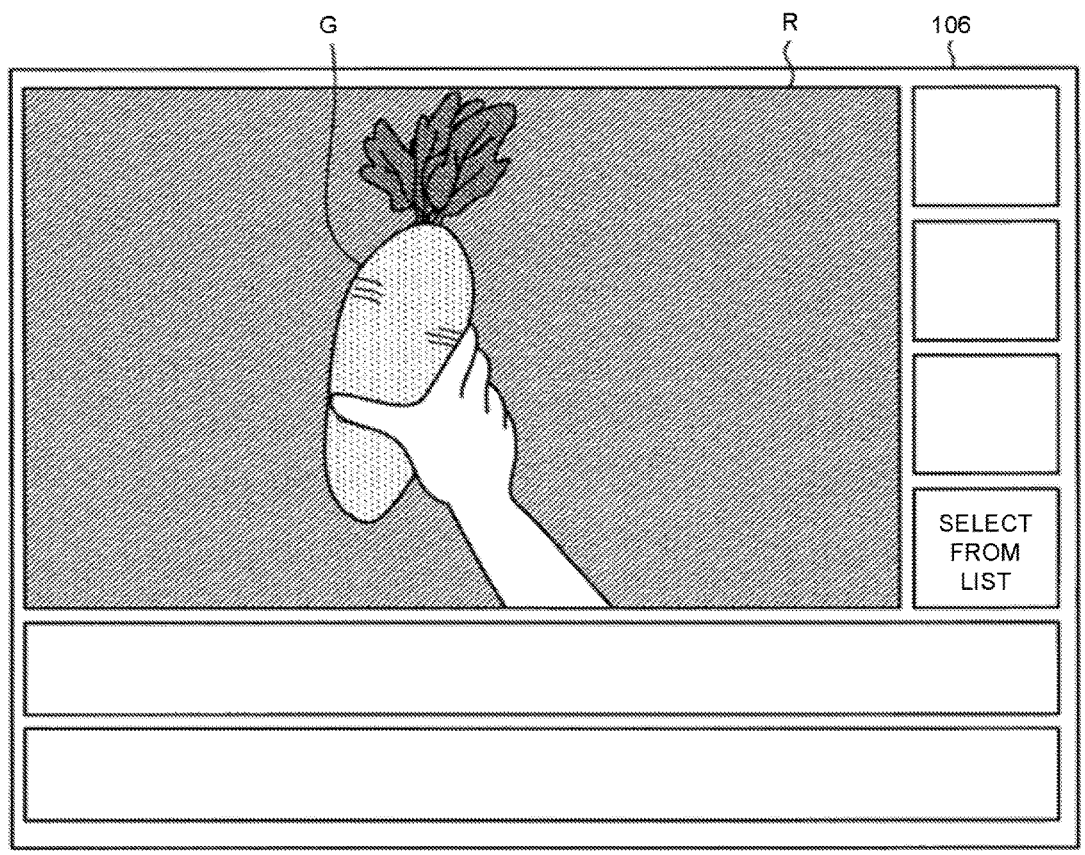
FIG. 5 is a view illustrating an example of a captured image.

FIG. 5 illustrates the captured image acquired by the first image acquisition section 501. As shown in FIG. 5, if the store clerk holds the commodity G over the reading window 103, the whole or a part of the commodity G enters a reading area R of the image capturing section 164. The captured image of the commodity G captured by the image capturing section 164 is displayed on the display device 106 of the commodity reading apparatus 101.

The commodity detection section 502 represents the CPU 61 programmed to execute the following steps of the commodity sales data processing program PR1. The commodity detection section 502 detects the whole or part of the commodity G contained in the captured image acquired by the first image acquisition section 501 through a pattern matching technology to extract the feature values of the photographed commodity. Specifically, the commodity detection section 502 extracts a contour line from a binary image of the acquired captured image. Next, the contour line extracted from the previous captured image is compared with a contour line extracted from the current captured image to detect the commodity G which is directed to the reading window 103 for the sales registration.

As another method for detecting the commodity, it is detected whether there is a flesh color area from the acquired captured image. If the flesh color area is detected—in other words, if the hand of the store clerk is detected—the aforementioned detection of the contour line near the flesh color area is carried out to try to extract the contour line of the commodity that is assumed to be held by the hand of the store clerk. At this time, if a contour line representing the shape of the hand and the contour line of another object nearby the contour line of the hand are detected, the commodity detection section 502 detects the commodity G from the contour line of the article.

The first similarity degree calculation section 503 represents the CPU 61 programmed to execute the following steps of the commodity sales data processing program PR1. The first similarity degree calculation section 503 extracts the surface state such as the tint, the surface unevenness condition and the like of the commodity G from the whole or a part of the image of the commodity G captured by the image capturing section 164 as the feature values. Specifically, the first similarity degree calculation section 503 extracts the feature values of the commodity G from the captured image in which the commodity G is detected by the commodity detection section 502. In addition, to shorten the processing time, the first similarity degree calculation section 503 may not take the contour and the size of the commodity G into consideration.

The first similarity degree calculation section 503 respectively compares the feature value of each commodity (hereinafter, referred to as a "registered commodity") registered in the PLU file F1 with the feature values of the commodity G extracted from the captured image to calculate a similarity degree between the commodity G and each registered commodity. The similarity degree quantitatively indicates how much similar the feature values of the registered commodity and the feature values of the commodity G extracted from the captured image are. For example, in a case in which the feature value of the commodity G extracted from the captured image is completely coincident with the feature value of some registered commodity, the similarity degree is 100% (1.0). With respect to tint and the unevenness condition of the surface, for example, the weighting may be changed to calculate the similarity degree.

The recognition of the object contained in an image as stated above is referred to as generic object recognition. As to the generic object recognition, various recognition technologies are described in the following document:

Keiji Yanai "Present situation and future of generic object recognition", Journal of Information Processing Society, Vol. 48, No. SIG16 [Search on Aug. 30th, 2016], Internet<URL: http://mm.cs.uec.ac.jp/IPSJ-TCVIM-Yanai.pdf>.

In addition, the technology carrying out the generic object recognition by carrying out an area-division on the image for each object is described in the following document:

Jamie Shotton etc, "Semantic Texton Forests for Image Categorization and Segmentation", [Search on Aug. 30th, 2016], Internet<URL: http://citeseerx.ist.psu.edu/viewdoc/download?doi=10.1.1.14 5.3036&rep=rep1&type=pdf>.

No limitation is given to the method of calculating the similarity degree between the image of the photographed commodity G and the registered commodity registered in the PLU file F1. For example, the similarity degree between the image of the photographed commodity G and each registered commodity in the PLU file F1 may be calculated by an absolute evaluation or a relative evaluation.

If the similarity degree is calculated by the absolute evaluation, the feature value of the commodity G and the feature value of each registered commodity are compared one by one, and the similarity degree derived from the comparison result can be adopted without any modification or change. In a case in which the similarity degree is calculated by the relative evaluation, the similarity degree may be calculated as long as the sum of the similarity degrees between the feature value of the commodity G and the feature value of each registered commodity becomes 1.0 (100%) . For example, a case where feature values of five registered commodities (e.g., commodities GA, GB, GC, GD and GE) are registered is assumed. In this case, for the commodity G, it is calculated that the similarity degree with respect to the commodity GA is 0.6, the similarity degree with respect to the commodity GB is 0.1, the similarity degree with respect to the commodity GC is 0.1, the similarity degree with respect to the commodity GD is 0.1, the similarity degree with respect to the commodity GE is 0.1, and thus the sum of the similarity degrees is 1.0.

The similarity degree determination section 504 represents the CPU 61 programmed to execute the following steps of the commodity sales data processing program PR1. Based on the similarity degree calculated by the first similarity degree calculation section 503, the similarity degree determination section 504 confirms the registered commodity corresponding to the commodity G or selects the registered commodity which is a candidate for the commodity G. In the present embodiment, a plurality of conditions is stepwise arranged for the similarity degree between the registered commodity and the commodity G, and the similarity degree determination section 504 confirms the registered commodity or selects the candidate according to the met condition. The conditions relating to the similarity degree are not specifically limited. However, the following conditions a-c are described as an example in the present embodiment.

The condition a and the condition b are used to confirm the commodity G photographed by the image capturing section 164 as one commodity of the registered commodities registered in the PLU file F1. The condition c is used to extract the candidate of the commodity G photographed by the image capturing section 164 from the registered commodities registered in the PLU file F1.

The similarity degree determination section 504 confirms that the registered commodity satisfying the condition a or the condition b is a commodity (hereinafter, referred to as a confirmed commodity) corresponding to the commodity G photographed by the image capturing section 164 one by one. The similarity degree determination section 504 determines that the registered commodity satisfying the condition c is not the confirmed commodity but a candidate (hereinafter, referred to as a commodity candidate) of the commodity G photographed by the image capturing section 164. By extracting the registered commodity satisfying the condition c from a plurality of the registered commodities registered in the PLU file F1, the commodity candidate of the commodity G is extracted.

Although the details of the conditions a-c are not particularly limited as long as they are stepwise set according to the similarity degree, as an example, the conditions a-c can be provided by a plurality of preset threshold values . A case of setting the conditions a-c as a first threshold value, a second threshold value and a third threshold value is described. The relationship among the threshold values is set in such a manner that the first threshold value>the second threshold value>the third threshold value.

The similarity degree determination section 504 counts number of times where the similarity degree thereof is equal to or greater than the predetermined first threshold value (for example, 90%) among the similarity degrees which are calculated by the first similarity degree calculation section 503 for each captured image regarding one commodity G held over the image capturing section 164 by the store clerk. If the number of times is equal to or greater than a predetermined number of times, the similarity degree determination section 504 determines that the condition a is met. If the first threshold value is sufficiently highly set so that there is no erroneous determination, the condition a may be determined by setting the predetermined number of times to once.

The similarity degree determination section 504 determines that the condition b is met if the similarity degree with the registered commodity is smaller than the first threshold value (for example, 90%) and is equal to or greater than the second threshold value (for example, 75%) that is smaller than the first threshold value. Then, the registered commodity satisfying the condition b is the confirmed commodity; however, the confirmation operation by the store clerk is required. Furthermore, the similarity degree determination section 504 counts the number of times in which the similarity degree with the registered commodity is smaller than the first threshold value and is equal to or greater than the second threshold value that is smaller than the first threshold value, and may determine that the condition b is met if the number of times is equal to or greater than the predetermined times.

The similarity degree determination section 504 determines that the condition c is met if the similarity degree with the registered commodity is smaller than the second threshold value (for example, 75%) and is equal to or greater than the third threshold value (for example, 10%) that is smaller than the second threshold value. Furthermore, the similarity degree determination section 504 counts the number of times in which the similarity degree with the registered commodity is smaller than the second threshold value and is equal to or greater than the third threshold value that is smaller than the second threshold value, and may determine that the condition c is met if the number of times is equal to or greater than the predetermined times.

Each of the conditions a-c can be properly set according to magnitude in value of the similarity degree and number of times of determination, and is not limited to the above example. The predetermined number of times used in the determination of the conditions a-c may be different for each condition.

The commodity presentation section 505 represents the CPU 61 programmed to execute the following steps of the commodity sales data processing program PR1. The commodity presentation section 505 notifies the store clerk and the customer that the commodity photographed by the image capturing section 164 is uniquely confirmed as the confirmed commodity that satisfies the condition a or the condition b by outputting an image or issuing a sound. More specifically, the commodity presentation section 505 displays a confirmation screen A1 (refer to FIG. 6) indicating that the registered commodity satisfying the condition a is uniquely confirmed as the commodity photographed by the image capturing section 164 on the display device 106.

Figure 6:
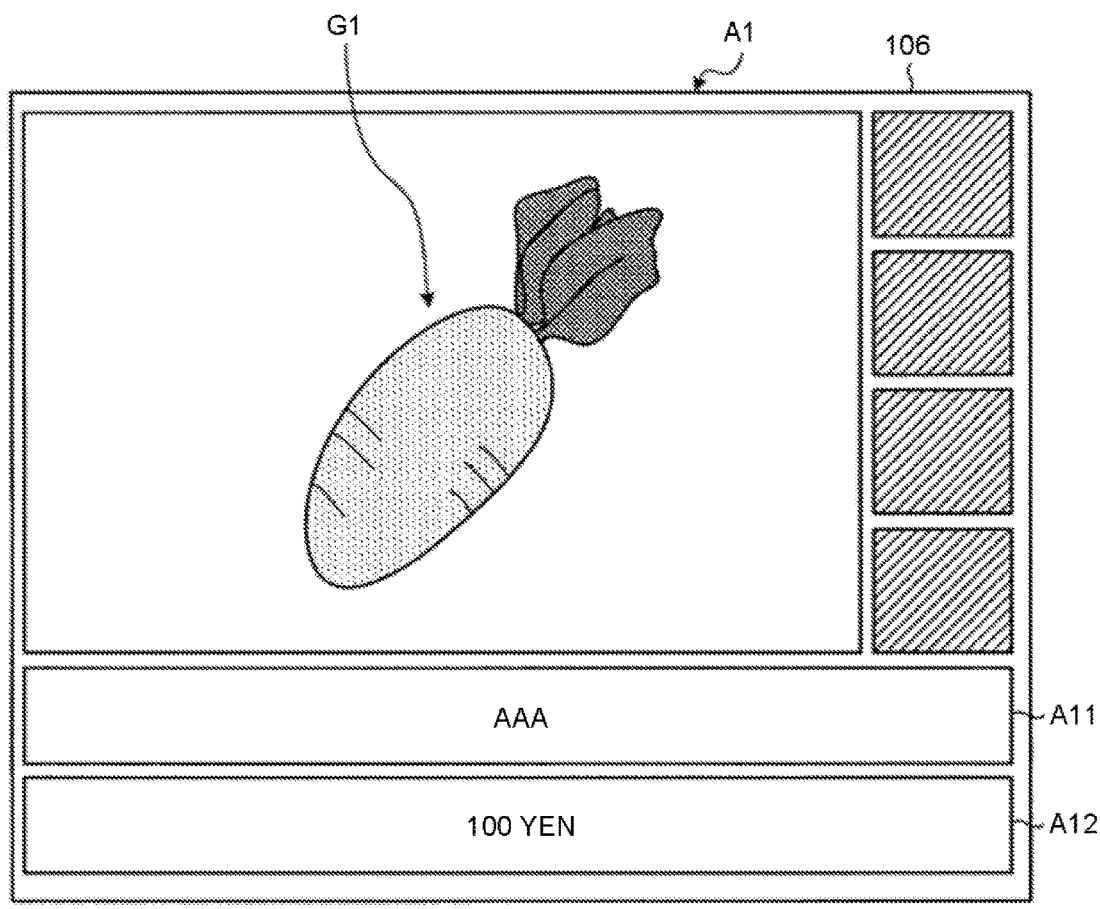
FIG. 6 is a view illustrating an example of a determination screen.

FIG. 6 illustrates the confirmation screen A1. If there is the registered commodity satisfying the condition a, the commodity presentation section 505 stops displaying the captured image in the reading area R (refer to FIG. 5), reads out an illustration image G1 and a commodity name "AAA" corresponding to the confirmed commodity from the PLU file F1 and displays them on the confirmation screen A1. The commodity presentation section 505 displays the commodity name and the commodity price (e.g., unit price) of the confirmed commodity read out from the PLU file F1 in a commodity name display area A11 and a price display area A12, respectively. Furthermore, the commodity presentation section 505 may display a commodity image (photographed image stored in advance) read out from the PLU file F1 instead of the illustration image G1.

The commodity presentation section 505 displays a confirmation screen A2 (refer to FIG. 7) for receiving a final confirmation operation indicating whether or not the registered commodity satisfying the condition b is the commodity G photographed by the image capturing section 164 on the display device 106.

Figure 7:
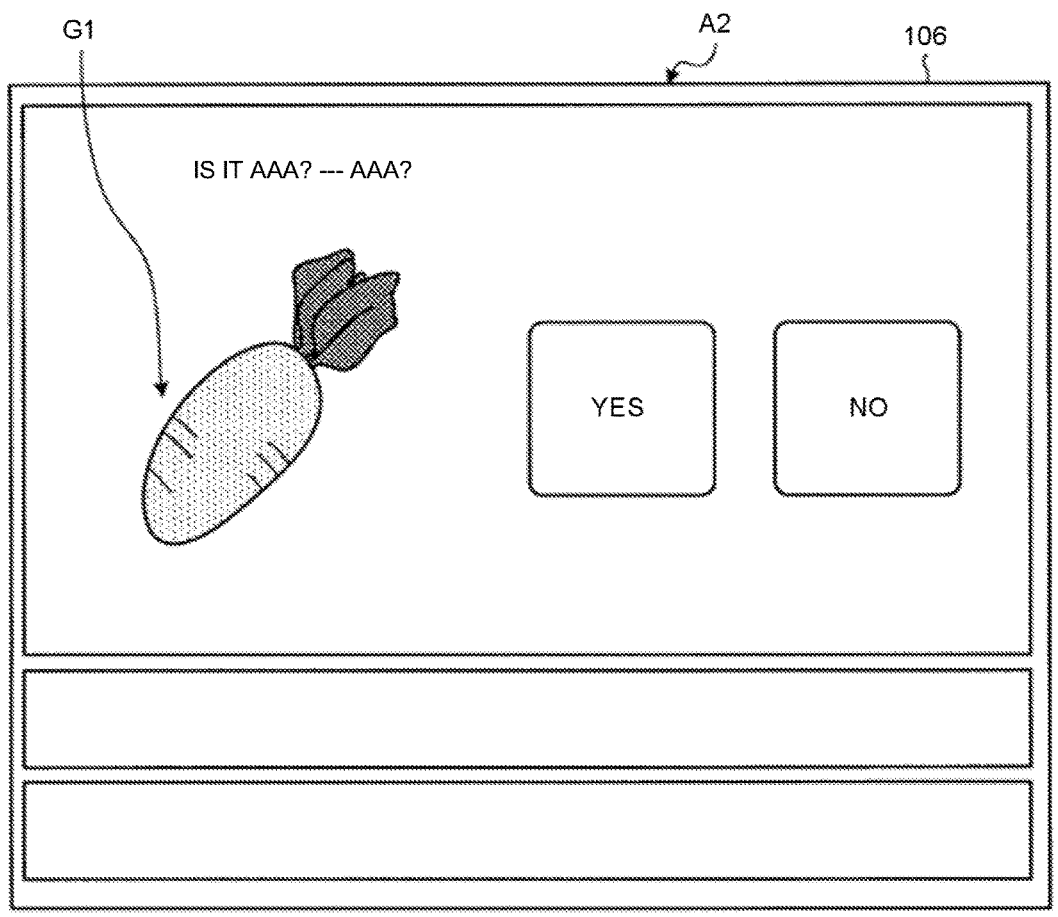
FIG. 7 is a view illustrating an example of a confirmation screen.

FIG. 7 illustrates the confirmation screen A2. If there is a registered commodity satisfying the condition b, the commodity presentation section 505 reads out an illustration image G1 corresponding to the confirmed commodity from the PLU file F1 and displays the illustration image G1 on the confirmation screen A2. The commodity presentation section 505 uses the commodity name of the confirmed commodity read out from the PLU file F1 to display a message for inquiring whether the read commodity G is the commodity of the illustration image G1, for example, "AAA?". In the confirmation screen A2, buttons such as "Yes/No" are provided in a selectable manner by a touch operation on the touch panel 105.

In this way, in the confirmation screen A2, as the result of the similarity degree determination, the commodity name and the commodity image of the registered commodity uniquely selected for one commodity G are shown and thus the commodity G and the registered commodity with one-to-one relationship are displayed.

The commodity presentation section 505 displays information relating to the registered commodity satisfying the condition c as the commodity candidate on the display device 106. More specifically, the commodity presentation section 505 reads out the illustration images and the commodity names of the registered commodities satisfying the condition c from the PLU file F1 to display them in a descending order from a commodity with the highest similarity degree calculated by the first similarity degree calculation section 503 on a commodity candidate selection screen A3 (refer to FIG. 8).

Figure 8:
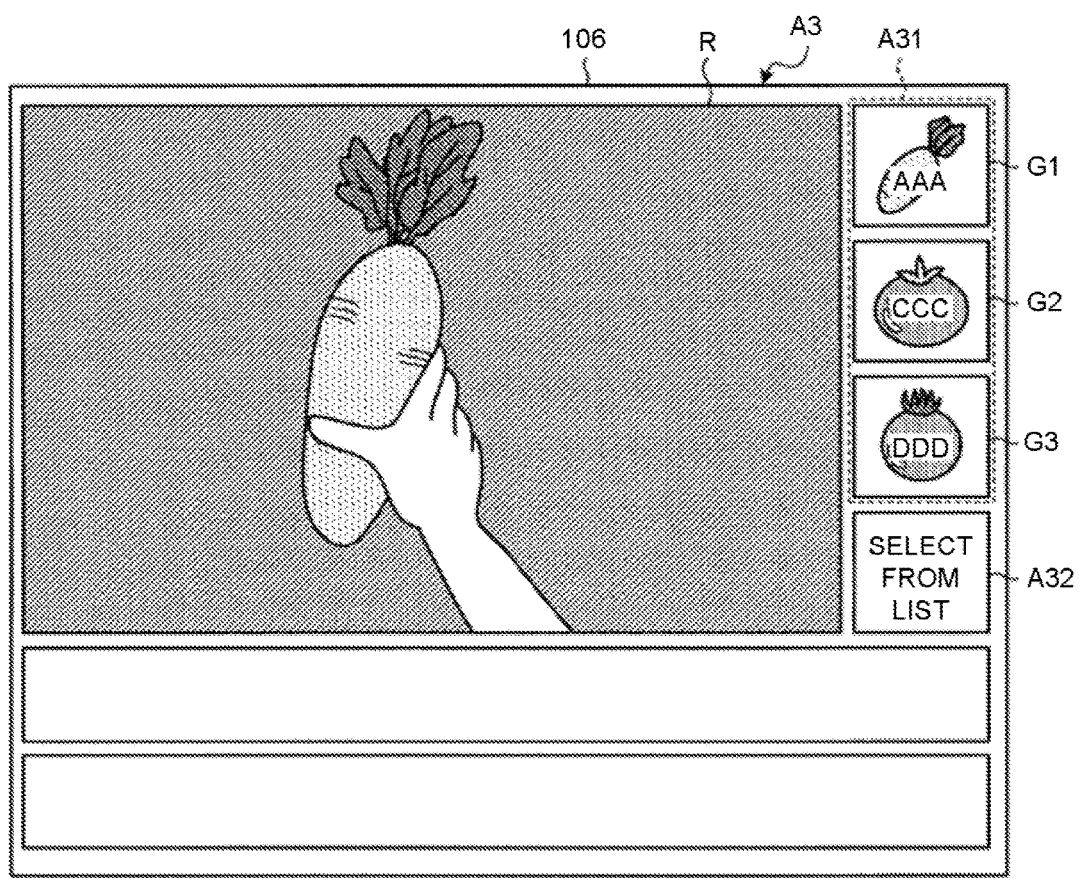
FIG. 8 is a view illustrating an example of a commodity candidate selection screen.

FIG. 8 illustrates the commodity candidate selection screen A3. As shown in FIG. 8, in the commodity candidate presentation area A31 of the commodity candidate selection screen A3, in the order from the registered commodity with the highest similarity degree, the illustration images G1, G2 and G3 and the commodity names of the commodity candidates are displayed. These illustration images G1, G2 and G3 are selectable according to a selection operation on the touch panel 105. At the lower portion of the commodity candidate presentation area A31, a selection button A32 for selecting the commodity from the commodity list is arranged and the commodity selected from the commodity list is processed as the above-mentioned confirmed commodity. In FIG. 8, an example in which three commodity candidates are displayed corresponding to the illustration images G1-G3 is shown; however, the number of the commodity candidates and display method are not limited to three. Instead of the illustration image, the commodity image may be displayed as the commodity candidate.

Furthermore, even in a state in which the illustration images G1-G3 of the commodity candidates are displayed on the display device 106, in a case in which the selection operation on these commodity candidates is not received, an image acquisition processing by the first image acquisition section 501, a detection processing by the commodity detection section 502 and a similarity degree calculation processing by the first similarity degree calculation section 503 are continued. Thus, while the commodity candidates are not selected, the captured image in the reading area R is displayed on the screen of the display device 106.

The input reception section 506 represents the CPU 61 programmed to execute the following steps of the commodity sales data processing program PR1. The input reception section 506 receives various input corresponding to the display on the display device 106 via the touch panel 105 or the keyboard 107. For example, the input reception section 506 receives an input operation indicating that it is confirmed that the commodity of the displayed illustration image G1 is the confirmed commodity based on the selection operation on the confirmation screen A2 (refer to FIG. 7). The commodity presentation section 505 displays the above-mentioned confirmation screen A1 on the display device 106 if the input reception section 506 receives the confirmation operation.

The input reception section 506 receives the selection operation on any one of the illustration images G1-G3 (refer to FIG. 8) of the commodity candidates displayed on the display device 106. The input reception section 506 receives the registered commodity of the selected illustration image as the confirmed commodity for the commodity G. The commodity presentation section 505 displays the confirmation screen A1 on which the received commodity candidate is displayed as the confirmed commodity on the display device 106 if the input reception section 506 receives the selection operation.

The information input section 507 represents the CPU 61 programmed to execute the following steps of the commodity sales data processing program PR1. The information input section 507 receives input information (for example, the commodity ID and the commodity name) indicating the confirmed commodity via the connection interface 175 for the confirmed commodity confirmed as stated above. The information input section 507 may receive input of sales items that are separately input via the touch panel 105 or the keyboard 107, using, for example, the commodity ID.

The misrecognition detection section 508 represents the CPU 61 programmed to execute the following steps of the commodity sales data processing program PR1. The misrecognition detection section 508 detects that the store clerk executes an operation indicating misrecognition to the confirmed commodity or the commodity candidate presented by the commodity presentation section 505. The misrecognition detection section 508 acquires the captured image of the commodity G used in the determination of the confirmed commodity or the commodity candidate as the misrecognized image if the operation indicating the misrecognition is executed. The misrecognition detection section 508 stores the acquired misrecognized image in the HDD 64 in association with the commodity ID of the registered commodity selected as the confirmed commodity by the store clerk.

The operation for indicating the misrecognition executed by the store clerk is not specifically limited. For example, the misrecognition detection section 508 determines that the operation indicating the misrecognition is executed by the store clerk on condition that another registered commodity different from the displayed registered commodity is selected on the confirmation screen A1 in FIG. 6. In this case, the misrecognition detection section 508 stores the misrecognition image in association with the commodity ID of another registered commodity (confirmed commodity) selected by the store clerk.

For example, the misrecognition detection section 508 determines that the operation indicating the misrecognition is executed by the store clerk on condition that "NO" button is selected on the confirmation screen A2 in FIG. 7. In this case, the misrecognition detection section 508 stores the misrecognition image in association with the commodity ID of the registered commodity selected as the confirmed commodity by the store clerk after the operation on the "NO" button is executed.

Still, for example, the misrecognition detection section 508 determines that the operation indicating the misrecognition is executed by the store clerk on condition that another commodity candidate different from the commodity candidate with the highest similarity degree is selected from the commodity candidates (refer to FIG. 8) displayed in the descending order of the similarity degree, or the selection button A32 is operated. In this case, the misrecognition detection section 508 stores the misrecognition image in association with the commodity ID of another registered commodity selected by the store clerk.

The sales registration section 509 represents the CPU 61 programmed to execute the following steps of the commodity sales data processing program PR1. The sales registration section 509 carries out the sales registration of the corresponding commodity based on the commodity ID and the sales quantity input from the information input section 507. Specifically, the sales registration section 509 refers to the PLU file F1 and records the commodity ID and the commodity category, the commodity name, the unit price and the like corresponding to the commodity ID together with the sales quantity in the sales master file to execute the sales registration.

Next, functional components relating to the learning processing are described. As stated above, based on the similarity degree between the feature value of the commodity G extracted from the image data captured by the image capturing section 164 and the feature values registered in the PLU file F1, the POS terminal 11 utilizes the generic object recognition technology which detects an article.

However, the commodities G such as fruits and vegetables to be recognized by the generic object recognition may differ in texture and color of the surface depending on the producing area and season even in the same varieties. If the textures and colors of the surfaces are different even in the same varieties, there is a problem that the similarity degree between the commodity G and feature values registered in advance in the PLU file F1 becomes small, and the recognition rate decreases.

Therefore, for the purpose of new registration of the feature values in the PLU file F1 and updating of the features values, the POS terminal 11 is provided with a learning function for registering the feature values in the PLU file F1 using the commodities G such as the fruits and vegetables actually sold in the store.

In one embodiment, the CPU 61 of the POS terminal 11 is programmed with the learning processing program PR2 to realize the functions of an article designation section 511, a second image acquisition section 512, a second similarity degree calculation section 513, a first relationship section 514, a second relationship section 515, an exclusion processing section 516, a learning processing section 517, a generation management section 518 and a roll back processing section 519 as functional sections relating to the learning function. In another embodiment, the CPU 61 is a hardware controller, e.g., an application specific integrated circuit (ASIC) and field programmable gate array (FPGA), that is configured to carryout the functions of the article designation section 511, the second image acquisition section 512, the second similarity degree calculation section 513, the first relationship section 514, the second relationship section 515, the exclusion processing section 516, the learning processing section 517, the generation management section 518 and the roll back processing section 519.

The article designation section 511 represents the CPU 61 programmed to execute the following steps of the commodity sales data processing program PR2. The article designation section 511 functions as a designation module of the present embodiment. The article designation section 511 designates the registered commodity (hereinafter, referred to as a learning target article) which is a target of the learning processing from the PLU file F1. Specifically, if the commodity ID and the commodity name of the learning target article are selected by the store clerk from the list of the registered commodities stored in the PLU file F1, the article designation section 511 designates the registered commodity corresponding to the commodity ID and the commodity name as the learning target article. If newly registering the feature value, the article designation section 511 designates the commodity ID and the commodity name to be newly registered. The article designation section 511 may automatically select the learning target article in addition to the designation of the learning target article according to the operation of the store clerk. For example, the article designation section 511 may automatically designate the registered commodity of which the recognition rate falls below a predetermined threshold value as the learning target article.

The second image acquisition section 512 represents the CPU 61 programmed to execute the following steps of the commodity sales data processing program PR2. The second image acquisition section 512 functions as an acquisition module according to the present embodiment. The second image acquisition section 512 acquires the captured image (hereinafter, referred to as a learning image) of the learning target article designated by the article designation section 511. For example, in a case of newly registering the feature value, the second image acquisition section 512 acquires the image of the learning target article captured by the image capturing section 164. In this case, since the second image acquisition section 512 functions similarly to the first image acquisition section 501, the first image acquisition section 501 may be used as the second image acquisition section 512. The second image acquisition section 512 acquires the misrecognized image of the commodity corresponding to the learning target article designated by the article designation section 511 from misrecognized images of commodities stored in the HDD 64 as the learning image.

The second similarity degree calculation section 513 represents the CPU 61 programmed to execute the following steps of the commodity sales data processing program PR2. The second similarity degree calculation section 513 functions as a calculation module of the present embodiment. The second similarity degree calculation section 513 extracts the surface state such as the tint and the unevenness condition of the surface of the article (hereinafter, referred to as a learning sample) included in the learning image as the feature value from the learning image acquired by the second image acquisition section 512. The second similarity degree calculation section 513 compares the feature value of each article registered in the PLU file F1 with the feature values of the learning sample extracted from each of the learning images. Then, the second similarity degree calculation section 513 calculates the similarity degree between the feature value of each learning sample and the feature value of the registered article for each learning sample.

In a case in which the feature value does not exist at the time of the new registration, the second similarity degree calculation section 513 may set the feature value extracted from one learning image as a representative feature value e to calculate the similarity degree with the remaining learning image(s). In this case, the learning image set as the representation may be selected by the store clerk or may be selected based on a random manner or predetermined criteria by the second similarity degree calculation section 513.

Since the extraction method of the feature value and the calculation method of the similarity degree by the second similarity degree calculation section 513 are similar to those by the first similarity degree calculation section 503, the first similarity degree calculation section 503 may be used as the second similarity degree calculation section 513.

The first relationship display section 514 represents the CPU 61 programmed to execute the following steps of the commodity sales data processing program PR2. The first relationship display section 514 functions as a generation module and a display module of the present embodiment. Based on the similarity degree for each learning sample calculated by the second similarity degree calculation section 513, the first relationship display section 514 generates first relationship information showing the relationship between the learning images. Specifically, the first relationship display section 514 generates a first relationship screen showing the similarity between the learning samples by a distance with respect to a predetermined reference value. The first relationship display section 514 displays the generated first relationship information on the display device 23 as the first relationship screen.

Figure 9:
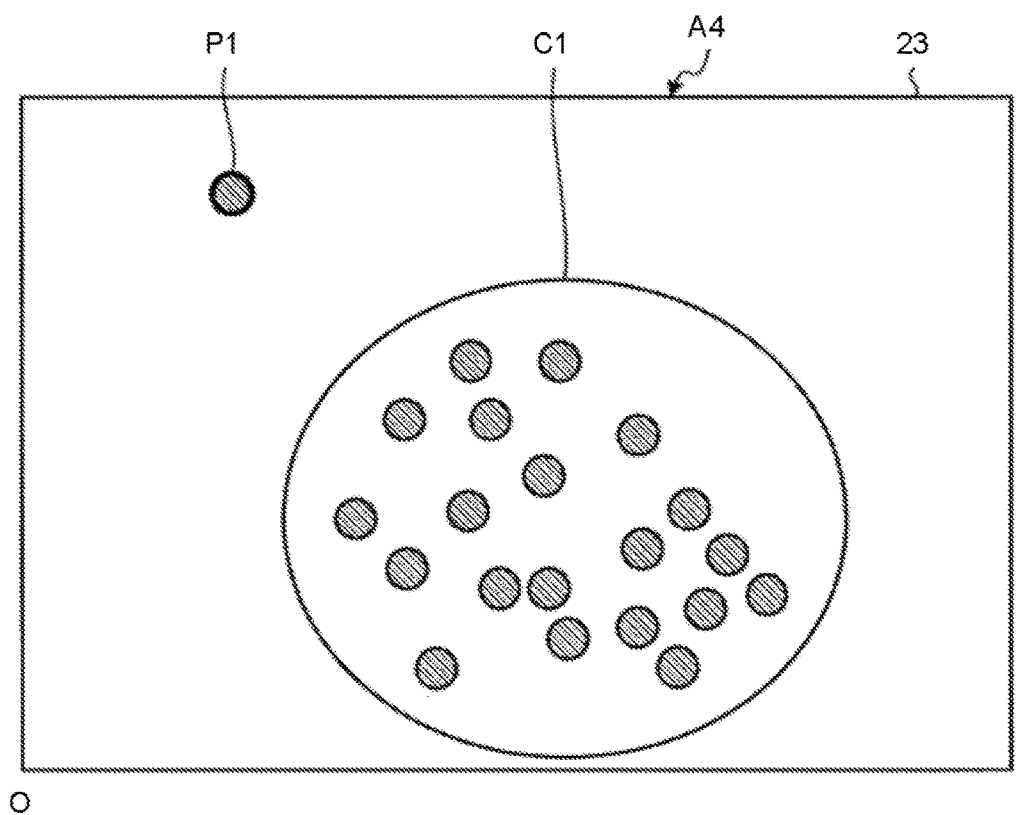
FIG. 9 is a view illustrating an example of a first relationship screen.

FIG. 9 illustrates the first relationship screen. The first relationship screen A4 in FIG. 9 is a distribution diagram (e.g., scatter diagram) showing the similarity degree of each learning sample with respect to a reference value by a distance from an origin O in a two dimensional space with two items (for example, color and shape) relating to the similarity degree determination as variables. The reference value for displaying the similarity degree of each learning sample as the distance is set on the origin O. In the present embodiment, the feature value (collation or reference data) of the learning target article is set as the reference value. In this case, the closer the distance is to the origin O, the higher the similarity degree with the feature value becomes. A well-known calculation method such as an Euclidean distance and a Hamming distance can be used regardless of the method of calculating the distance.

The position at which the reference value is set is not limited to the origin O. For example, the position may be set at the center of the first relationship screen A4. The reference value is not limited to the feature value of the learning target article, but may be set to other values. For example, an average value or a median of the similarity degrees calculated based on the similarity degrees of learning samples may be set. In this case, the closer the distance is to the origin O, the closer the similarity degree is to the average value or the median.

The first relationship screen A4 shows the similarity between the learning samples. Specifically, between the learning samples with same or similar tendency of the similarity degree with respect to the reference value, an interval between plot positions at which the learning sample is plotted is closer. On the other hand, between the learning sample (P1 in FIG. 9) deviating from this tendency and the learning sample with the similar tendency, the interval between the plot positions may be farther. Therefore, the learning samples with the same or similar tendency of the similarity degree form an aggregation (e.g., cluster C1), and the learning sample deviating from the tendency is plotted at a position away from the cluster C1. There is a high possibility, on the one hand, that the learning samples forming the aggregation are the same article. There is a high possibility, on the other hand, that the learning sample plotted at a position far from the aggregation of the learning sample contains foreign objects other than the learning target article in the learning image.

Therefore, by confirming whether or not each of the learning images is included in the cluster C1, the store clerk can easily determine whether or not the learning image includes a foreign object other than the learning target article. Since learning image including the foreign object is a factor for lowering the recognition rate, it is desirable to exclude such learning image from the target of the learning processing.

In FIG. 9, the number of items relating to the similarity degree determination is set to two (two variables), but it is not limited to this and may be multiple variables equal to or greater than three variables. In FIG. 9, the first relationship screen A4 is not limited to the distribution diagram (e.g., scatter diagram), but it may be generated in a multidimensional space corresponding to the number of items or in another display form.

If the store clerk selects the plotted point (one learning sample) on the first relationship screen, the first relationship display section 514 may carry out control to display the learning image corresponding to the selected learning sample on the display device 106. Furthermore, if the learning image is selected from the second relationship screen by cooperating with the second relationship display section 515 described later, the first relationship display section 514 may highlight the plot of the learning sample corresponding to the learning image selected.

A circle figure surrounding the cluster C1 shown in Fig. 9 may be input by the store clerk to designate a learning sample group, or may be automatically displayed as guide information by the first relationship display section 514. In the latter case, the first relationship display section 514 determines the learning sample group in which the interval between adjacent plot positions is equal to or less than a predetermined threshold value as one aggregation and displays the learning sample group by surrounding the learning sample group with a figure such as the circle shown in FIG. 9.

The second relationship display section 515 represents the CPU 61 programmed to execute the following steps of the commodity sales data processing program PR2. The second relationship display section 515 functions as a generation module and a display module, according to the present embodiment. Based on the similarity degree for each learning sample calculated by the second similarity degree calculation section 513, the second relationship display section 515 generates second relationship information indicating the relationship between the learning images. Specifically, the second relationship display section 515 generates the second relationship information in which the learning images are arranged in an order according to the similarity degree calculated by the second similarity degree calculation section 513. The second relationship display section 515 displays the generated second relationship information on the display device 23 as a second relationship screen.

Figure 10:
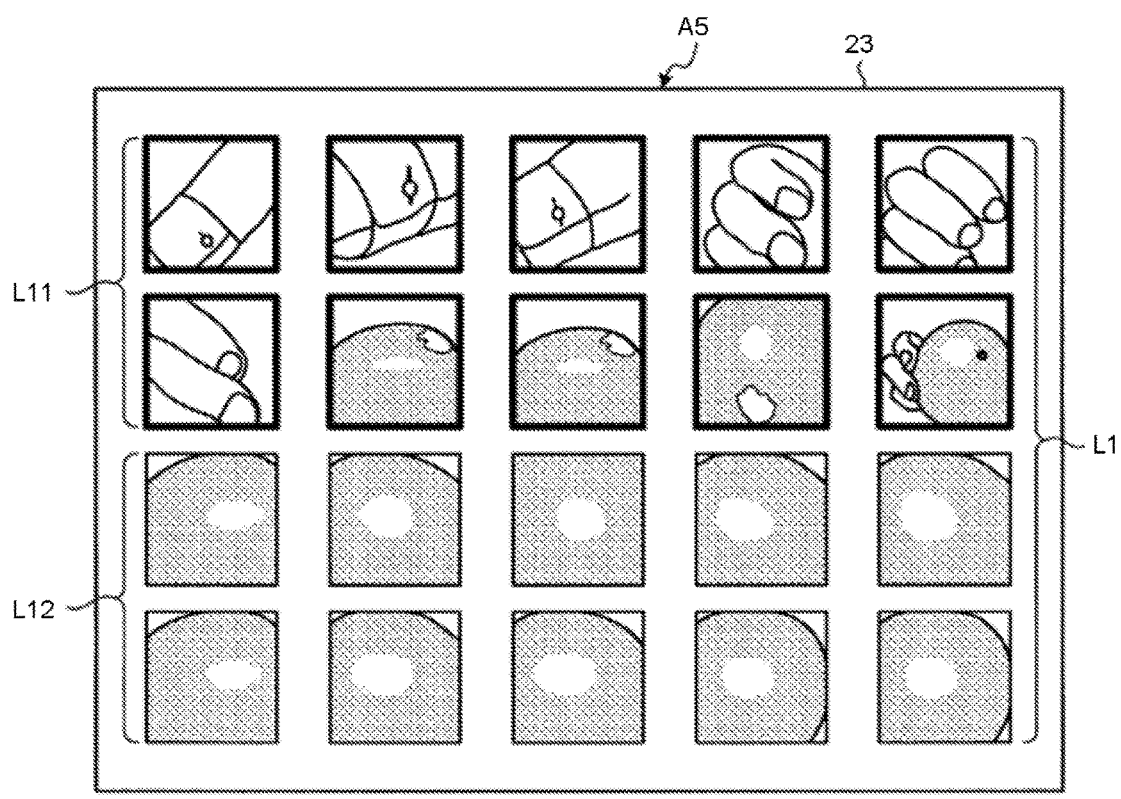
FIG. 10 is a view illustrating an example of a second relationship screen.

FIG. 10 illustrates the second relationship screen. As shown in FIG. 10, in a second relationship screen A5, the learning images L1 are displayed as a list in a manner of reduced images such as thumbnails. In the second relationship screen A5, based on the similarity degrees calculated from the learning images L1 by the second similarity degree calculation section 513, the second relationship display section 515 arranges the learning images L1 in an ascending order of the similarity degrees. In the example in FIG. 10, the learning images L1 are arranged in such a manner that the similarity degrees rise from the left to right direction, and are arranged to fold back from the right end to the left end of the lower stage.

The second relationship display screen A5 shows the relationship between the learning images L1. Specifically, since the learning images L1 are arranged in the ascending order of the similarity degrees, a learning image L11 with the low similarity degree with the feature value (collation or reference data) is positioned at the upper side of the second relationship screen A5, and a learning image L12 with the high similarity degree with the feature value (collation or reference data) is positioned at the lower side of the second relationship screen A5.

For example, in each learning image L11, since foreign objects other than the learning target article, such as clothes and a finger of the store clerk, a label and the like are included, the calculated similarity degree is low compared with the learning images L12 which do not contain such foreign objects. Therefore, the learning images L11 are displayed above the learning images L12, as described above.

Therefore, by confirming whether or not the learning image is positioned at the upper side of the second relationship screen A5, the store clerk can easily determine whether or not the learning image contains also the foreign object other than the learning target article. Since the second relationship screen A5 displays the learning images L1 in a comparable state, the store clerk can easily confirm the state of each learning image L1. The learning image L11 including also the foreign object other than the learning target article becomes a factor for lowering the recognition rate, and thus it is desirable to exclude such learning image L11 from the target of the learning processing.

In FIG. 10, the learning images are arranged in 4 rows and 5 columns; however, the arrangement number of the learning images and the display method are not limited to those. For example, the second relationship display section 515 may display the learning images, that cannot be displayed within the second relationship screen A5, an a scrolling manner by providing a scroll bar or the like in the second relationship screen A5. In FIG. 10, the learning images are arranged in the ascending order of the similarity degrees; however, the learning images may be arranged in a descending order of the similarity degrees.

The second relationship display section 515 may carry out control, if the thumbnail of the displayed learning image is selected by the store clerk, to display the selected learning image in an original size thereof. Furthermore, the second relationship display section 515 may display the learning image corresponding to the learning sample displayed on the second relationship screen in a highlight manner by cooperating with the first relationship display section 514 if the plot of the learning sample is selected on the first relationship screen. Either the first relationship display screen or the second relationship display screen may be selectively displayed responding to a switching operation by the store clerk, or both of them may be displayed simultaneously.

In FIG. 10, the learning images L11 are highlighted with frames respectively; however, the emphasis display may be executed in response to the designation of the learning image by the store clerk, or may be automatically executed by the second relationship display section 515 as the guide information. In the latter case, the second relationship display section 515 highlights the learning image of which the similarity degree is less than the predetermined threshold value by surrounding it with the frame.

The exclusion processing section 516 represents the CPU 61 programmed to execute the following steps of the commodity sales data processing program PR2. The exclusion processing section 516 functions as an exclusion module of the present embodiment. The exclusion processing section 516 executes a processing of excluding the learning image which is a non-target of the learning processing from the learning images acquired by the second image acquisition section 512. Specifically, based on the relationship information (e.g., the first relationship information and the second relationship information) generated by the first relationship display section 514 or the second relationship display section 515, the exclusion processing section 516 excludes the captured image meeting the predetermined condition from the learning images acquired by the second image acquisition section 512.

For example, the exclusion processing section 516 may set the learning image corresponding to a designated learning sample as the non-target of the learning processing if the learning sample to be excluded is designated by the store clerk from the learning samples shown on the first relationship screen. The exclusion processing section 516 may also set a designated learning image to the non-target of the learning processing if the learning image to be excluded is designated by the store clerk from the learning images shown on the second relationship screen.

Thus, since the store clerk can designate the learning image to be excluded while watching the first relationship screen and the second relationship screen, the learning image containing also foreign object other than the learning target article can be easily excluded from the target of the learning processing.

The learning image to be excluded is not limited to being designated by the store clerk, but may be automatically selected by the exclusion processing section 516. Based on setting information stored in the HDD 64 or the like, the exclusion processing section 516 automatically selects the learning image meeting the predetermined condition from the learning images shown on the first relationship screen and the second relationship screen to set it as the non-target of the learning processing. The setting information includes, for example, a threshold value of the distance between plot positions relating to determination of the cluster or the non-cluster, and a threshold value of the similarity degree relating to the determination of the target or the non-target of the learning processing. The exclusion processing section 516 sets, for example, the learning image of which the distance between the plot positions exceeds the threshold value from the first relationship screen as the non-target. The exclusion processing section 516 also sets, for example, the learning image of which the similarity degree is less than the threshold value from the second relationship screen as the non-target. The exclusion processing section 516 may automatically set the threshold value based on an operation history at the time the store clerk designates the exclusion of the learning image from the first relationship screen and the second relationship screen.

The learning processing section 517 represents the CPU 61 programmed to execute the following steps of the commodity sales data processing program PR2. The learning processing section 517 functions as a learning module of the present embodiment. The learning processing section 517 uses the learning images which remain after the image set by the exclusion processing section 516 as the non-target of the learning processing is excluded from the learning images acquired by the second image acquisition section 512 to execute the learning processing of the learning target article designated by the article designation section 511.

Specifically, the learning processing section 517 extracts the feature value of the learning sample from the remaining learning images obtained by excluding the image that is set as the non-target of the learning processing by the exclusion processing section 516 from the learning images acquired by the second image acquisition section 512. Then, the learning processing section 517 executes the learning processing of updating the feature values (collation or reference data) of the learning target article by using the extracted feature value. For example, in the case of new registration of the feature values, the learning processing section 517 sets the feature value of the extracted learning sample as the registered feature value, and registers it in the PLU file F1 in association with the commodity ID of the learning target article. In the case of updating the feature value (additional registration), the learning processing section 517 additionally registers the feature value of the extracted learning sample in the feature values registered in the PLU file F1 beforehand in association with the commodity ID of the learning target article to update the feature values.

The learning processing section 517 may execute the learning processing using the feature values of the learning sample previously extracted from the learning images by the second similarity degree calculation section 513. The learning processing section 517 can use a well-known technology without specifying a learning processing method.

In this way, the POS terminal 11 can execute the learning processing with respect to the learning target article by excluding images including also the foreign object other than the learning target article. Therefore, by using the learning function of the POS terminal 11, the learning processing relating to the object recognition can be executed efficiently.

In the meantime, although the feature values can be updated for each learning target article by the above-mentioned learning processing, there may be a case in which the recognition rate decreases by using the updated feature values after updating. For example, if the store clerk designates the learning target article by mistake (for example, variety) and the learning processing is executed, the recognition rate decreases. This is because a different commodity G is recognized According to the POS terminal 11 of the present embodiment, the generation management section 518 and the roll back processing section 519 are provided, and thus it is possible to roll back to or restore the previous feature values even if the learning processing is erroneously performed.

The generation management section 518 represents the CPU 61 programmed to execute the following steps of the commodity sales data processing program PR2. The generation management section 518 functions as a generation management module of the present embodiment. While the learning processing section 517 executes the learning processing, the generation management section 518 manages generation of the feature values registered by the learning processing for each registered commodity. For example, the generation management section 518 sets the feature values of each registered commodity registered in the PLU file F1 as a current generation, and if the feature values are updated by the learning processing, the generation management section 518 sets the feature values after updating is performed to the current generation and sets the feature values before change to the feature values of one generation ago. If the feature values are updated by the next learning processing, the generation management section 518 sets the feature values of the one generation ago to the feature values of two generations ago, and executes the setting operations of the above current generation and one generation ago.

The number of generations managed by the generation management section 518 is not particularly limited, and arbitrary values can be set. The method of the generation management is not particularly limited, and it is possible to hold a differential value from the previous generation. The storage area for managing the feature values in the past is not particularly limited, and for example, the HDD 64 maybe used.

The roll-back processing section 519 represents the CPU 61 programmed to execute the following steps of the commodity sales data processing program PR2. The roll back processing section 519 functions as a roll back module of the present embodiment. The roll back processing section 519 executes a roll back processing to the feature values based on the feature values in the past managed by the generation management section 518. Specifically, if the store clerk instructs execution of the roll back operation, the roll-back processing section 519 displays a roll back screen for selecting the registered commodity and the feature values subject to the roll-back based on the feature values managed by the generation management section 518 on the display device 23.

Figure 11:
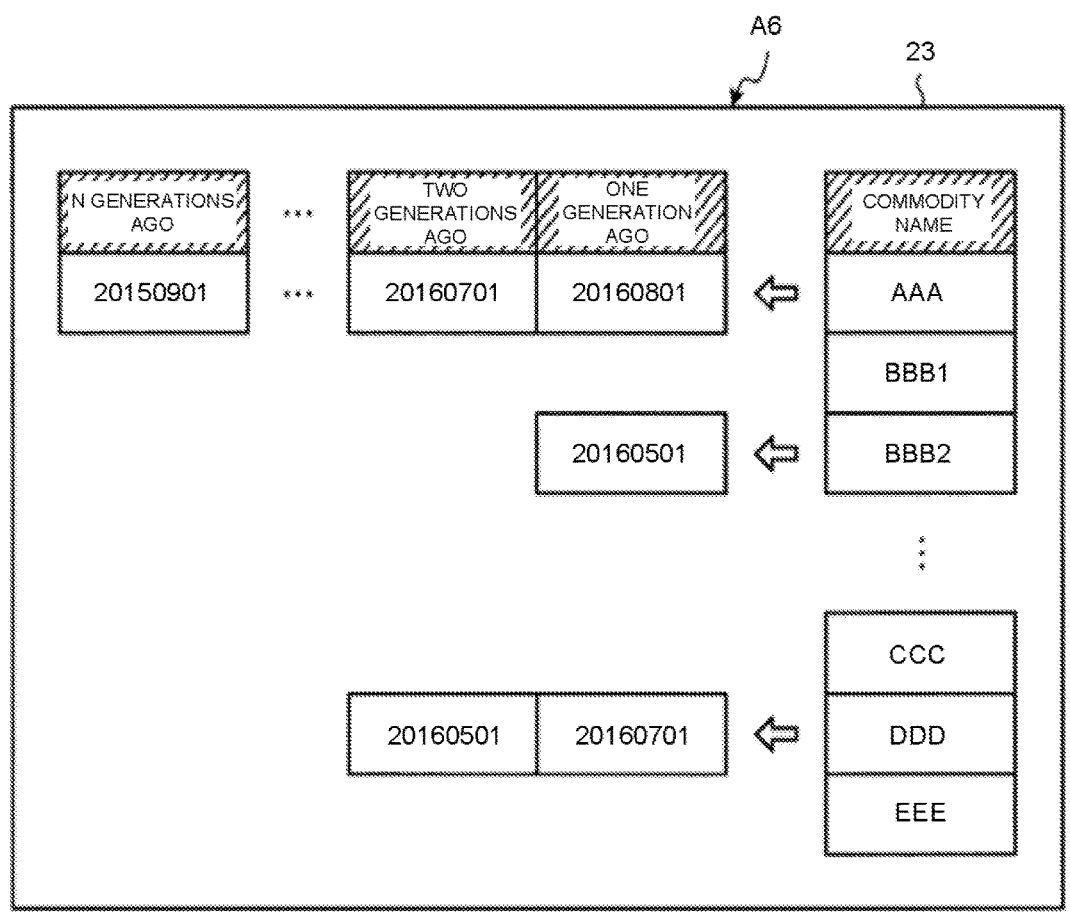
FIG. 11 is a view illustrating an example of a roll back screen.

FIG. 11 is a diagram illustrating the roll back screen. As shown in FIG. 11, a roll back screen A6 displays data identifier of each feature value to which the generation management is executed for that registered commodity in association with the commodity name of each registered commodity. The data identifier includes, for example, data name of the feature value, time stamp (indicating generation, update date and time) attached to the feature value and the like. Additional information such as a recognition rate obtained by the feature values of that generation may be displayed together with the data identifier.

The commodity name and the data identifier displayed on the roll back screen A6 function as operators selectable by the store clerk. For example, if one of the registered commodities which are targets of the roll back is selected by the store clerk, the roll back processing section 519 enables a selection operation on the operator displayed in association with the registered commodity. The roll-back processing section 519 disables the selection operation on the operator of selecting another registered commodity different from the selected registered commodity. If one of the data identifiers is operated by the store clerk, the roll-back processing section 519 executes the roll-back processing to overwrite the feature values corresponding to the operated data identifier on the feature values of the commodity name which is the roll-back target registered in the PLU file F1.

The feature values of the current generation before the roll-back is performed may be deleted after rolling back or the generation management section 518 may execute generation management to change the feature values of the current generation to the feature values of one generation ago.

As a result, even if the recognition rate drops due to the learning processing, it is possible to roll back to the previous feature values so that the recognition rate can be improved.

Figure 12:
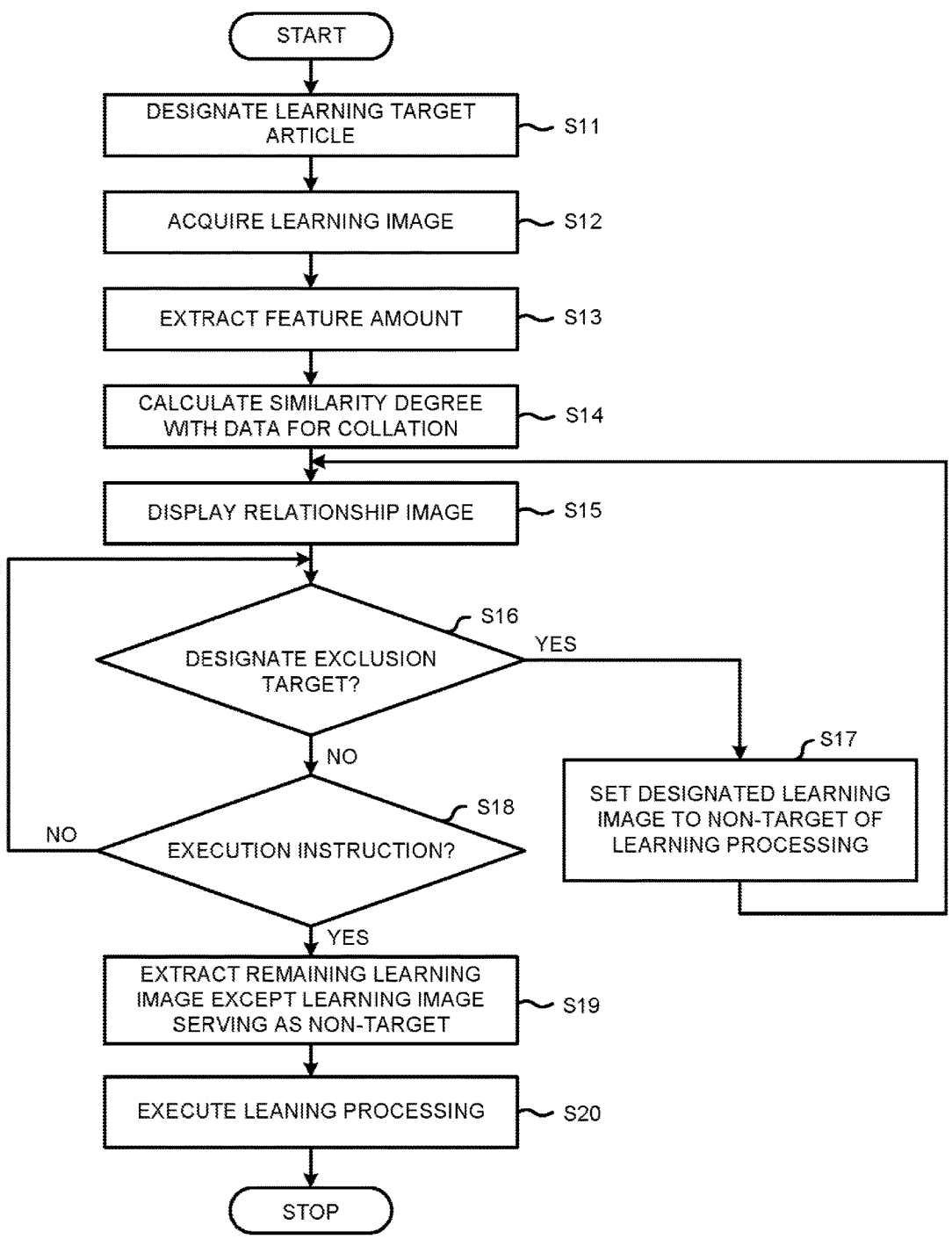
FIG. 12 is a flowchart illustrating an example of a learning processing.

Next, the operation of the checkout system 1 relating to the learning processing is described in detail. FIG. 12 is a flowchart illustrating the procedure of the learning processing executed by the checkout system 1.

First, the article designation section 511 designates the learning target article, i.e., the target of the learning processing, according to the selection operation by the store clerk (Act S11). Next, the second image acquisition section 512 acquires the learning image of the learning target article designated in Act S11 (Act S12).

Subsequently, the second similarity degree calculation section 513 extracts the feature values of the learning sample from each of the learning images acquired in Act S12 (Act S13). The second similarity degree calculation section 513 compares the feature values of each learning sample extracted in Act S13 with the feature values (collation or reference data) of the learning target article registered in the PLU file F1 to calculate the similarity degree with the feature values (collation or reference data) for each learning sample (Act S14).

The first relationship display section 514 and the second relationship display section 515 displays relationship screens (i.e., the first relationship screen and the second relationship screen) showing the relationship between the learning images on the display device 106 based on the similarity degree for each learning sample calculated in Act S14 (Act S15). The first relationship display screen and the second relationship display screen may be displayed at the same time, or either of them may be displayed in response to the switching operation by the store clerk.

The exclusion processing section 516 determines whether or not an image subject to the exclusion is designated by the store clerk based on the relationship screen displayed in Act S15 (Act S16). If the image to be excluded is designated (Yes in Act S16), the exclusion processing section 516 sets the designated image as non-target of the learning processing (Act S17). Then, by returning the processing to Act S15, the exclusion processing section 516 displays a relationship screen on which the image designated by the store clerk is not displayed by the first relationship display section 514 and the second relationship display section 515.

If no image is designated to be excluded (No in Act S16), the learning processing section 517 determines whether or not the store clerk instructs the execution of the learning processing (Act S18). If the execution of the learning processing is not instructed (No in Act S18), the learning processing section 517 returns to the processing in Act S16 and then waits for an instruction for executing the learning processing.

If the execution of the learning processing is instructed (Yes in Act S18), the learning processing section 517 extracts the remaining learning images obtained by excluding the image set to be the non-target of the learning processing in Act S17 from the learning images acquired in Act S12 (Act S19). Based on the learning images extracted in Act S19, the learning processing section 517 executes the learning processing on the feature values of the learning target article designated in Act S11 (Act S20).

Figure 13:
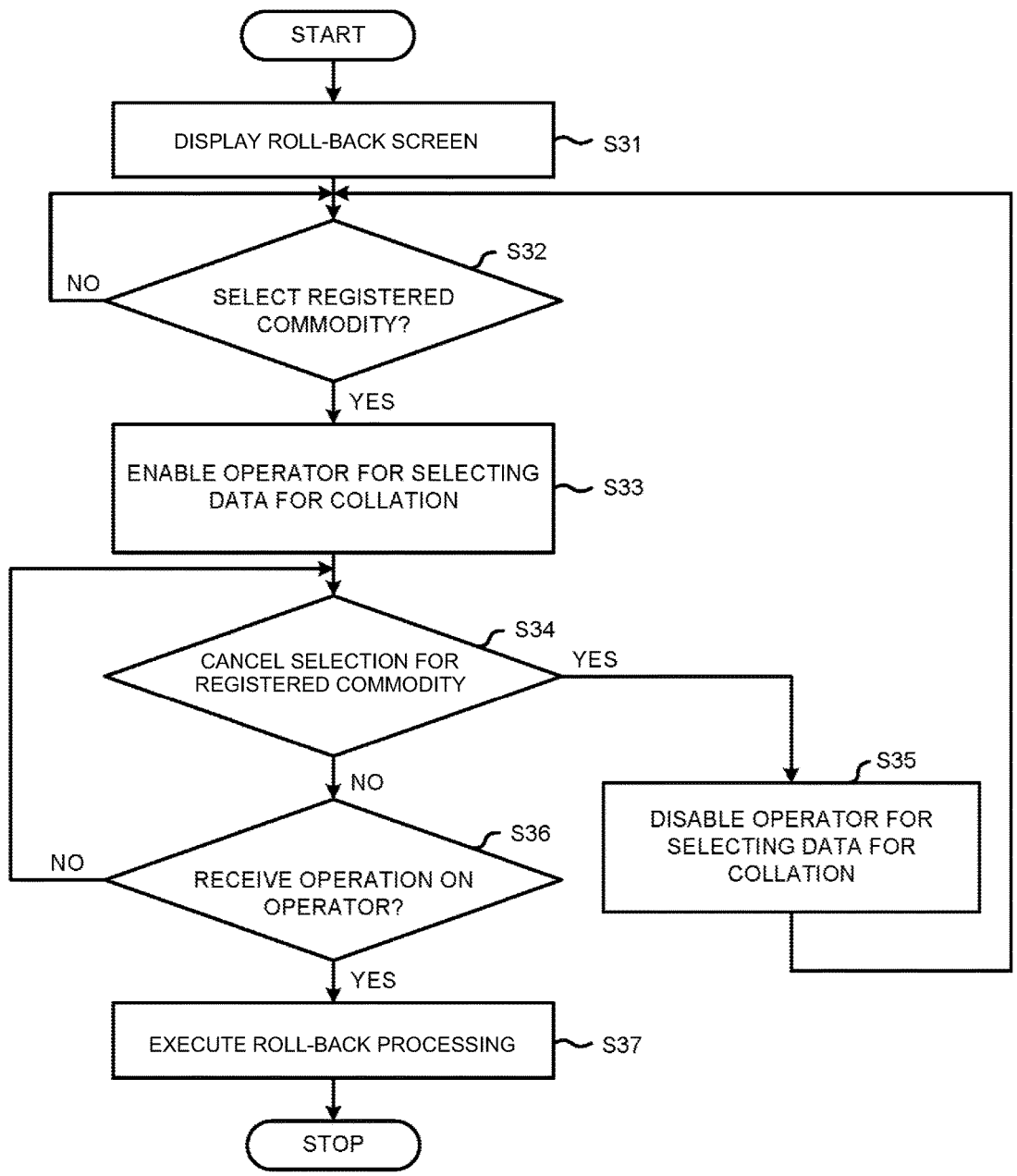
FIG. 13 is a flowchart illustrating an example of a roll back processing.

Next, the operation of the checkout system 1 relating to the roll back processing is described in detail. FIG. 13 is a flowchart illustrating the procedure of the roll back processing executed by the checkout system 1. As a prerequisite to the present processing, it is assumed that the generation management of the feature values is executed by the generation management section 518 for each registered commodity.

Based on the feature values managed by the generation management section 518, the roll back processing section 519 displays a roll back screen (refer to FIG. 11) for selecting the registered commodity and the feature values subject to the roll-back on the display device 23 (Act S31).

The roll back processing section 519 waits for until the registered commodity subject to the roll-back is selected by the store clerk (No in Act S32). If the registered commodity to be rolled back is selected (Yes in Act S32), the roll-back processing section 519 enables the operator for selecting the feature values to which the generation management is executed in association with the selected registered commodity (Act S33).

The roll-back processing section 519 waits for an operation instruction by the store clerk (No in Act S34→No in Act S36). If the cancellation of selection of the registered commodity selected in Act S32 is instructed (Yes in Act S34), the roll back processing section 519 disables the operator enabled in Act S33 (Act S35), and returns to the processing in Act S32.

If one of the operators enabled in Act S33 is operated (Yes in Act S36), the roll back processing section 519 executes the roll back processing for overwriting the feature values corresponding to the operated operator on the feature values of the current generation of the registered commodity selected in Act S32 (Act S37).

As stated above, according to the commodity recognition apparatus of the present embodiment, in the learning processing relating to the object recognition, the relationship screen showing the relationship between the learning images is displayed, and the learning image designated by the store clerk is excluded from the targets of the learning processing. As a result, the store clerk can easily identify and exclude the learning image including the foreign object based on the relationship screen showing the relationship between the learning images, and thus it is possible to efficiently execute the learning processing.

According to the commodity recognition apparatus of the present embodiment, the generation management is performed on the feature values (collation or reference data), and roll-back operation is performed on the feature values according to the instruction by the store clerk. Thus, for example, in the case in which the recognition rate decreases due to the execution of the learning processing, since the previous feature value can be restored, it is possible to enhance the advantage of the learning processing.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, in the above embodiment, the POS terminal 11 includes the PLU file F1; however, the present invention is not limited to that. The commodity reading apparatus 101 may be provided with the PLU file F1, and an external device accessible by the both of commodity reading apparatus 101 and the POS terminal 11 may be provided with the PLU file F1.

In the above embodiment, the POS terminal 11 is applied as the commodity registration apparatus having the functions of the article designation section 511, the second image acquisition section 512, the second similarity degree calculation section 513, the first relationship display section 514, the second relationship display section 515, the exclusion processing section 516, the learning processing section 517, the generation management section 518 and the roll back processing section 519; however, the present invention is not limited to that. For example, the commodity reading apparatus 101 may include part or all of the above-described functional sections, and may output a processing result such as a calculation result of the similarity degree to the POS terminal 11. For example, the information processing apparatus such as the store computer SC may have a part or all of the functional sections described above and output the results (for example, PLU file F1) of the learning processing and the roll-back processing to the POS terminal 11.

In the above embodiment, the extracted feature value is described as the stored feature value (collation or reference data); however, the stored feature value may be the captured commodity image (reference image).

In the above embodiment, the checkout system 1 including the POS terminal 11 having the commodity registration function and the settlement function and the commodity reading apparatus 101 is described as the store system; however, the present invention is not limited to this, and it may be, for example, applied to one apparatus having the functions of both the POS terminal 11 and the commodity reading apparatus 101. As the single apparatus having the functions of the POS terminal 11 and the commodity reading apparatus 101, there may be a self-checkout apparatus POS terminal installed in a store such as a supermarket.

The programs executed by each device of the foregoing embodiment may be incorporated into a storage medium (ROM or storage section) of each device to be provided; however, the present invention is not limited to this. The programs may be recorded in a computer-readable recording medium such as a CD-ROM, a FD (Flexible Disk), a CD-R, a DVD (Digital Versatile Disk) and the like in the form of installable or executable file to be provided. Further, the storage medium is not limited to a medium independent from a computer or an embedded system and also contains a storage medium that stores or temporarily stores the programs by downloading the programs transmitted through a LAN or an Internet.

Further, the programs executed by each device of the foregoing embodiment is stored in a computer connected with a network and downloaded via the network to be supplied or may be supplied or distributed via the network such as the Internet.

What is claimed is:

1. A commodity registration apparatus configured to perform object recognition, comprising:
   an interface connected to receive captured images;
   a storage unit storing a dictionary for the object recognition; and
   a processor configured to:
   designate a learning target article which is target of a learning processing;
   extract, from each captured image, feature values indicating features of an article contained in the captured image, compare each of the extracted feature values with stored feature values of the learning target article registered in the dictionary, and calculate a similarity degree therebetween;
   generate relationship information indicating a relationship between the captured images based on the calculated similarity degrees;
   exclude one or more of the captured images that meet a predetermined condition based on the relationship information; and
   execute the learning processing by adding, to the dictionary with respect to the learning target article, the feature values indicating features of the article contained in the captured images remaining after the exclusion processing is carried out.

2. The commodity registration apparatus according to claim 1, further comprising:
   a display device,
   wherein the processor is further configured to generate, for display on a display device, a relationship screen showing the relationship between the captured images based on the generated relationship information.

3. The commodity registration apparatus according to claim 2, wherein the predetermined condition is an average distance between a plot of the captured image to be excluded and plots of the other captured images on the relationship screen being greater than a threshold value.

4. The commodity registration apparatus according to claim 2, wherein the predetermined condition is a selection made on the relationship screen of a plot of the captured image to be excluded.

5. The commodity registration apparatus according to claim 1, wherein the predetermined condition is that the captured image to be excluded has a similarity degree less than a threshold value.

6. The commodity registration apparatus according to claim 1, wherein the relationship information indicates similarity between the captured images.

7. The commodity registration apparatus according to claim 1, further comprising:
a display device,
wherein the processor is further configured to generate, for display on a display device, a relationship screen with the captured images arranged in an order of the corresponding calculated similarity degree.

8. The commodity registration apparatus according to claim 1, wherein the processor is further configured to:
store a generation number of feature values added to the dictionary with respect to the learning target article in accordance with the learning processing, and
undo feature values added to the dictionary in a current generation and to restore feature values to the dictionary based on features values included in a prior generation.

9. A method of updating a dictionary for object recognition, comprising:
designating a learning target article which is target of a learning processing;
acquiring captured images for the learning processing;
extracting, from each captured image, feature values indicating features of an article contained in the captured image;
comparing each of the extracted feature values with stored feature values of the learning target article registered in a dictionary and calculating a similarity degree therebetween;
generating relationship information indicating a relationship between the captured images based on the calculated similarity degree;
excluding one or more of the captured images that meet a predetermined condition based on the relationship information; and
executing the learning processing by adding, to the dictionary with respect to the learning target article, the feature values indicating features of the article contained in the captured images remaining after the excluding is carried out.

10. The method according to claim 9, further comprising:
generating a relationship screen showing the relationship between the captured images based on the generated relationship information; and
displaying the relationship screen on a display device.

11. The method according to claim 10, wherein the predetermined condition is an average distance between a plot of the captured image to be excluded and plots of the other captured images on the relationship screen being greater than a threshold value.

12. The method according to claim 10, wherein the predetermined condition is a selection made on the relationship screen of a plot of the captured image to be excluded.

13. The method according to claim 9, wherein the predetermined condition is that the captured image to be excluded has a similarity degree less than a threshold value.

14. The method according to claim 9, wherein the relationship information indicates similarity between the captured images.

15. The method according to claim 9, further comprising:
generating a relationship screen with the captured images arranged in an order of the corresponding calculated similarity degree; and
displaying the relationship screen on a display device.

16. The method according to claim 9, further comprising:
storing a generation number of feature values added to the dictionary with respect to the learning target article in accordance with the learning processing; and
undoing feature values added to the dictionary in a current generation and restoring feature values to the dictionary based on features values included in a prior generation.

17. A non-transitory computer readable medium containing instructions that cause a commodity registration apparatus to perform a learning method that comprises:
designating a learning target article which is target of a learning processing;
acquiring captured images for the learning processing;
extracting, from each captured image, feature values indicating features of an article contained in the captured image;
comparing each of the extracted feature values with stored feature values of the learning target article registered in a dictionary and calculating a similarity degree therebetween;
generating relationship information indicating a relationship between the captured images based on the calculated similarity degree;
excluding one or more of the captured images that meet a predetermined condition based on the relationship information; and
executing the learning processing by adding, to the dictionary with respect to the learning target article, the feature values indicating features of the article contained in the captured images remaining after the excluding is carried out.

18. The non-transitory computer readable medium according to claim 17, wherein the predetermined condition is an average distance between a plot of the captured image to be excluded and plots of the other captured images on the relationship screen being greater than a threshold value.

19. The non-transitory computer readable medium according to claim 17, wherein the predetermined condition is that the captured image to be excluded has a similarity degree less than a threshold value.

20. The non-transitory computer readable medium according to claim 19, wherein the method further comprises:
storing a generation number of feature values added to the dictionary with respect to the learning target article in accordance with the learning processing; and
undoing feature values added to the dictionary in a current generation and restoring feature values to the dictionary based on features values included in a prior generation.

* * * * *